(12) United States Patent
Venugopal et al.

(10) Patent No.: US 8,639,866 B2
(45) Date of Patent: Jan. 28, 2014

(54) SYSTEMS AND METHODS FOR DIVIDING A COMMUNICATIONS CHANNEL

(75) Inventors: Raghavan V. Venugopal, Houston, TX (US); Stephen A. Kay, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3653 days.

(21) Appl. No.: 10/636,440

(22) Filed: Aug. 6, 2003

(65) Prior Publication Data

US 2005/0044230 A1 Feb. 24, 2005

(51) Int. Cl.
*G06F 13/00* (2006.01)
*G06F 13/362* (2006.01)

(52) U.S. Cl.
USPC ............................ 710/107; 710/115; 710/116

(58) Field of Classification Search
USPC ........... 710/117, 302, 310, 100, 305, 14, 300, 710/306, 317, 301, 2; 714/44, 5; 709/227, 709/203; 361/685, 724; 711/4, 114; 713/324; 307/116
See application file for complete search history.

(56) References Cited

U.S. PATENT DOCUMENTS

| | | | |
|---|---|---|---|
| 5,241,630 A | | 8/1993 | Lattin, Jr. et al. |
| 5,838,891 A * | | 11/1998 | Mizuno et al. ................... 714/5 |
| 6,061,752 A | | 5/2000 | Jones et al. |
| 6,065,096 A * | | 5/2000 | Day et al. ...................... 711/114 |
| 6,101,559 A * | | 8/2000 | Schultz et al. ................... 710/15 |
| 6,295,565 B1 * | | 9/2001 | Lee ................................. 710/301 |
| 6,338,110 B1 * | | 1/2002 | van Cruyningen ............ 710/317 |
| 6,449,725 B2 * | | 9/2002 | Deenadhayalan et al. ..... 713/324 |
| 6,460,104 B1 | | 10/2002 | Zandy et al. |
| 6,928,514 B2 * | | 8/2005 | Chatterjee et al. ............ 711/114 |
| 6,957,288 B2 * | | 10/2005 | Metevier et al. .............. 710/100 |
| 6,976,112 B2 * | | 12/2005 | Franke et al. ................. 710/302 |
| 6,983,303 B2 * | | 1/2006 | Pellegrino et al. ............ 709/203 |
| 7,073,022 B2 * | | 7/2006 | El-Batal et al. ............... 711/114 |
| 7,116,015 B2 * | | 10/2006 | Gan et al. ....................... 307/116 |
| 7,124,321 B2 * | | 10/2006 | Garnett et al. .................. 714/14 |
| 2002/0172195 A1 * | | 11/2002 | Pekkala et al. ................ 370/360 |
| 2003/0208656 A1 * | | 11/2003 | Hawkins ........................ 711/103 |
| 2004/0073806 A1 * | | 4/2004 | Zimmer ......................... 713/189 |
| 2004/0073833 A1 * | | 4/2004 | Krishnamurthy et al. ...... 714/10 |
| 2004/0083356 A1 * | | 4/2004 | Chatterjee et al. ................ 713/1 |
| 2004/0193770 A1 | | 9/2004 | Whiteman et al. |

OTHER PUBLICATIONS

Intel, Intel Integrated RAID Controller SRCU42L, Feb. 2003, pp. 1-37.*
ASUS, AP1400R Dual Pentium III 1U Rackmount Server, 2001, pp. 1-44.*
The I2C-Bus Specification, Philips Semiconductor, 2000, pp. 1-46.*

* cited by examiner

*Primary Examiner* — Henry Tsai
*Assistant Examiner* — Christopher Bartels

(57) ABSTRACT

Various exemplary systems and methods for dividing a communications channel are disclosed. In at least some embodiments the method may comprise: coupling a plurality of storage devices to a communication channel, detecting whether the communication channel has been divided into multiple sub-channels, and coupling either a first backplane controller or a second backplane controller to the storage devices based on whether the communication channel has been divided.

19 Claims, 4 Drawing Sheets

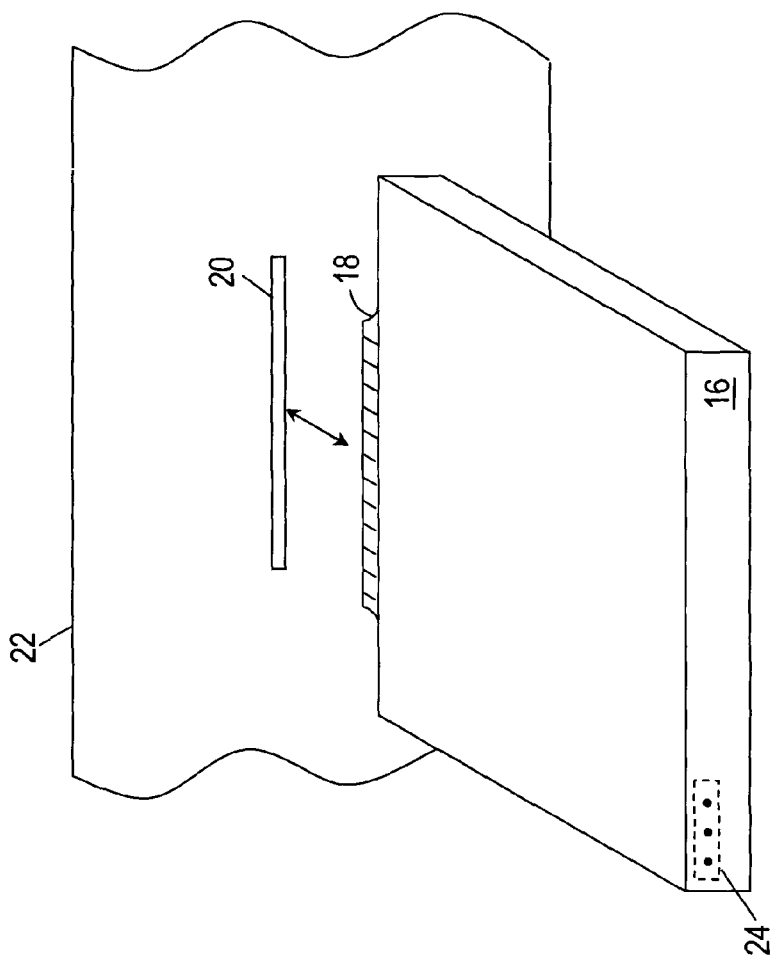
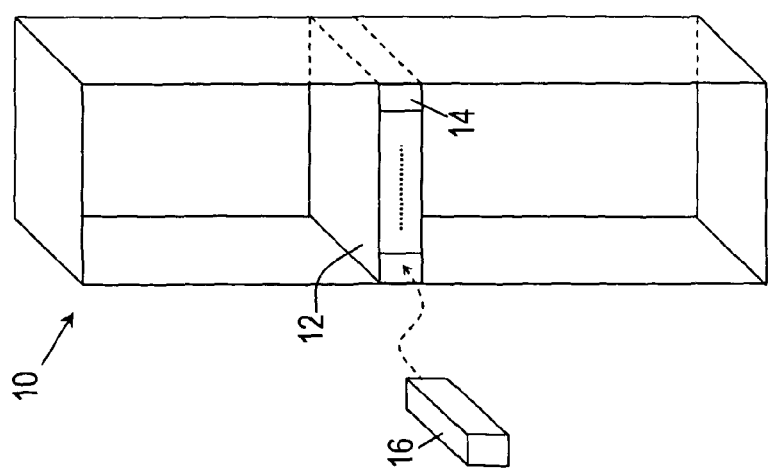

SYSTEMS AND METHODS FOR DIVIDING A COMMUNICATIONS CHANNEL

BACKGROUND

Recent trends in server technology include servers that may be contained in an enclosure, where the enclosure may be mounted in a rack. Because these servers may be rack mounted, the servers may need to conform to the dimensions of the rack. The servers may include various hardware devices including storage devices, which may also have to conform to the dimensions of the rack. Thus, the amount of storage space available to the server may be increased or decreased by adding or removing storage devices. The storage devices may be coupled to a common communications channel that exists on a backplane, where the communications channel includes a backplane controller. In this manner, the individual storage devices may operate as a larger array of storage devices where the backplane controller coordinates storing and retrieving information from the storage devices. When multiple storage devices exist within a server, it may be desirable to segment the storage space by dividing the communications channel into sub-channels. Dividing the communications channel may require separate backplane controllers for each sub-channel.

BRIEF SUMMARY

Various exemplary systems and methods for dividing a communications channel are disclosed. In at least some embodiments the method may comprise: coupling a plurality of storage devices to a communication channel, detecting whether the communication channel has been divided into multiple sub-channels, and coupling either a first backplane controller or a second backplane controller to the storage devices based on whether the communication channel has been divided.

BRIEF DESCRIPTION OF THE DRAWINGS

For a more detailed description of embodiments of the invention, reference will now be made to the accompanying drawings in which:

FIG. 1 shows a rack according to various embodiments of the invention;

FIG. 2 shows a storage device according to the various embodiments;

NOTATION AND NOMENCLATURE

Figure 3A:
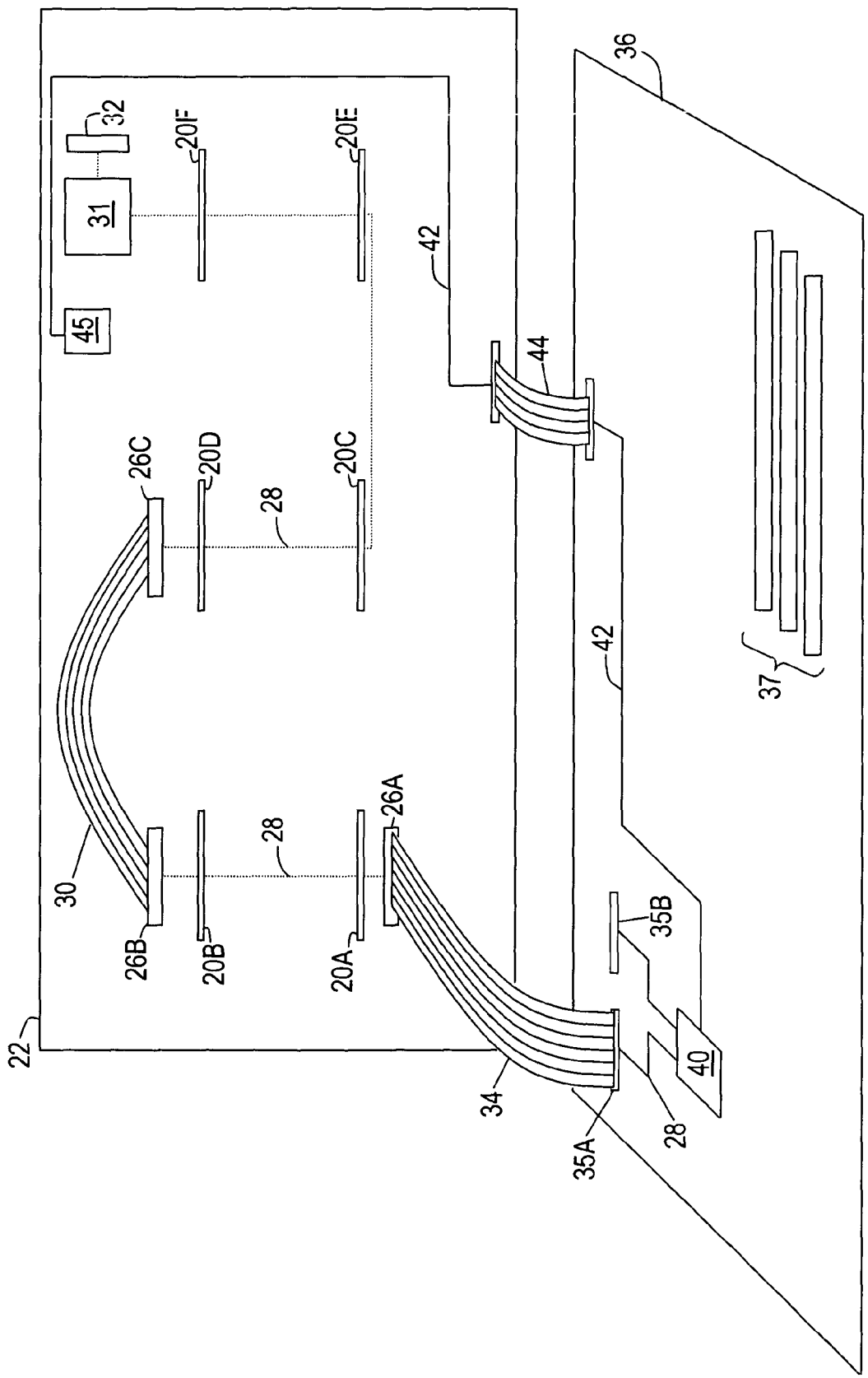
FIG. 3A shows an exemplary implementation of a storage controller and a backplane controller.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

This disclosure may contain subject matter that may be subject matter disclosed in U.S. Pat. Nos. 6,460,104, 6,061,752, and 5,241,630, all of which are incorporated herein by reference. This application is also related to application Ser. No. 10/636,171, entitled "Communicating Information in a Computer System" which is incorporated herein by reference.

Referring now to FIG. 1, a rack or support structure 10 is shown. In general, the support structure 10 may house any structure that is capable of accommodating one or more chassis 12. An exemplary chassis 12 is shown in FIG. 1 containing one or more configurable components 14 and 16 that are capable of being physically rearranged in the chassis 12. In addition, the configurable components 14 and 16 may be configured such that they perform a variety of functions. For example, in some embodiments, configurable components 14 and 16 may be configured as storage devices (e.g., hard disk, floppy disk, CD-ROM), but in other embodiments, they may be configured as switches, routers, or power supplies. Also, the configurable components may comprise entire servers, such as blade-type servers. As shown in FIG. 1, the storage device 16 may permit easy removal and insertion into a corresponding slot of the chassis 12. Accordingly, as storage devices may be inserted and removed from the chassis 12, a modular server may be built that is capable of adaptively meeting demand. Additionally, the rack 10 may include multiple chassis 12, which may further allow the overall capability of the system to be scaled to meet demand.

FIG. 2 shows a possible implementation of the storage device 16. As shown, the device may include electrical connector pins 18. The pins 18 preferably seat into a mating electrical connector 20 on a circuit board backplane 22, thereby allowing the device to be inserted into and removed from the backplane 22 as indicated by the double headed arrow. Backplane 22 may reside in the chassis 12 and the configurable components 14 and 16 may be inserted or removed from the backplane 22 during normal system operation. Inserting and/or removing the device during normal system operation is termed "hot swapping". Hot swapping may be advantageous in that the entire system does not need to be rebooted in order to recognize when devices are added to and removed from the system.

Storage device 16 preferably includes status indicators, such as light emitting diodes (LEDs) 24. Although FIG. 2 shows the LEDs on the face of the storage device 16, the LEDs 24 may be integrated at any suitable location on the storage device 16. Using the LEDs 24, information is conveyed to a user about the status of an individual storage device, regardless of the physical location of the LEDs 24. For example, if the LEDs 24 indicate device failure, then the user may need to hot swap the device.

FIG. 3A shows the backplane 22 including connectors 20A-F. Devices having dimensions and functions akin to storage device 16 may interface to the backplane 22 using connectors 20A-F. With multiple storage devices coupled to the backplane 22, a redundant array of independent disks (RAID) may be formed. In general, RAID techniques provide methods for redundantly accessing the multiple storage devices in the array as if the array were one large drive. Using RAID techniques, the time for retrieving data from storage devices may be reduced using "striping" techniques. Striping refers to reading information from or writing information to multiple storage devices concurrently. Performance of a storage device may be limited by the time it takes the storage device's mechanical components (e.g., disk head), to locate data. RAID techniques allow the mechanical latency associated with the storage devices to be decreased by operating these storage devices in parallel. For example, large files may be broken up into smaller segments prior to writing them to the redundant array of storage devices. Consequently, the smaller segments are preferably written to the redundant storage devices concurrently. Similarly, to read stored information, the segments of information may be concurrently read from the redundant storage devices and the larger file may be reconstituted. Reading and writing data in this manner may allow for faster performance.

Additionally, data integrity may be increased using RAID techniques. One technique involves duplicating the contents of one storage device on a second storage device. Thus, in the event of a failure of one storage device, the other storage device preferably provides a copy of the desired data. A second technique involves parity. Parity entails writing data to several storage devices in a sequential manner, where the last storage device stores data that is a function of the first and second storage devices. For example, data may be written to a first storage device coupled to connector 20C, and data also may be written to a second storage device coupled to connector 20D. A third storage device coupled to connector 20E may then store the exclusive OR of the contents of the first and second storage devices. In the event of the failure of a storage device, the contents of the failed device may be recreated by exclusive OR'ing the contents of the other storage devices. Therefore, using RAID techniques, data may be spread over the multiple storage devices so that the risks associated with device failure are reduced and the time for accessing data also are also reduced.

Referring still to FIG. 3A, devices coupled to backplane 22 may be configured into various arrangements using cable connectors 26A-C. For example, FIG. 3A shows a ribbon cable 30 coupled between cable connectors 26B and 26C. With ribbon cable 30 configured in this manner, devices coupled to connectors 20A-F may be interconnected over a common bus 28 as indicated by the dotted line. The common bus 28 preferably provides a communication channel over which the storage devices may communicate and form the redundant array described above. A backplane controller 31 couples to the bus 28, and a terminator 32 may be used to electrically terminate the bus 28. The backplane controller 31 preferably receives status and control information via the bus 28. Bus 28 may be any variety, including a small computer system interconnect (SCSI) bus. A ribbon cable 34 preferably couples cable connector 26A (also coupled to bus 28) to a cable connector 35A on an I/O board 36 as shown. I/O board 36 preferably includes cable connector 35B, which may be used to divide or split bus 28 as described below.

Ribbon cable 34 preferably couples the bus 28 to a storage controller 40, which may reside on the I/O board 36. The storage controller 40 may implement RAID techniques on bus 28. I/O board 36 preferably includes board connectors 37 for expansion boards. For example, board connectors 37 may contain an expansion board with another storage controller to be used in conjunction with storage controller 40, or instead of storage controller 40. Storage controller 40 may implement RAID techniques over bus 28. In addition, the storage controller 40 preferably couples to an auxiliary bus 42. Bus 42 may be any variety, including a two wire $I^2C$ bus. A ribbon cable 44 preferably couples the bus 42 to the backplane 22. On the backplane 22, the bus 42 couples to a secondary backplane controller 45. In general, backplane controllers 31 and 45 receive status and control information regarding the storage devices coupled to the backplane. The backplane controllers 31 and 45 may indicate the status of the various storage devices by illuminating the appropriate LED 24.

The arrangement of the ribbon cables 30 and 34 on the backplane 22 shown in FIG. 3A is referred to as a "single bus" bus arrangement because bus 28 comprises a single continuous bus. With backplane 22 configured in this manner, the storage devices coupled to connectors 20A-F may operate as a single storage array, and backplane controller 31 may be used to receive and/or process status and control information for the various storage devices.

Figure 3B:
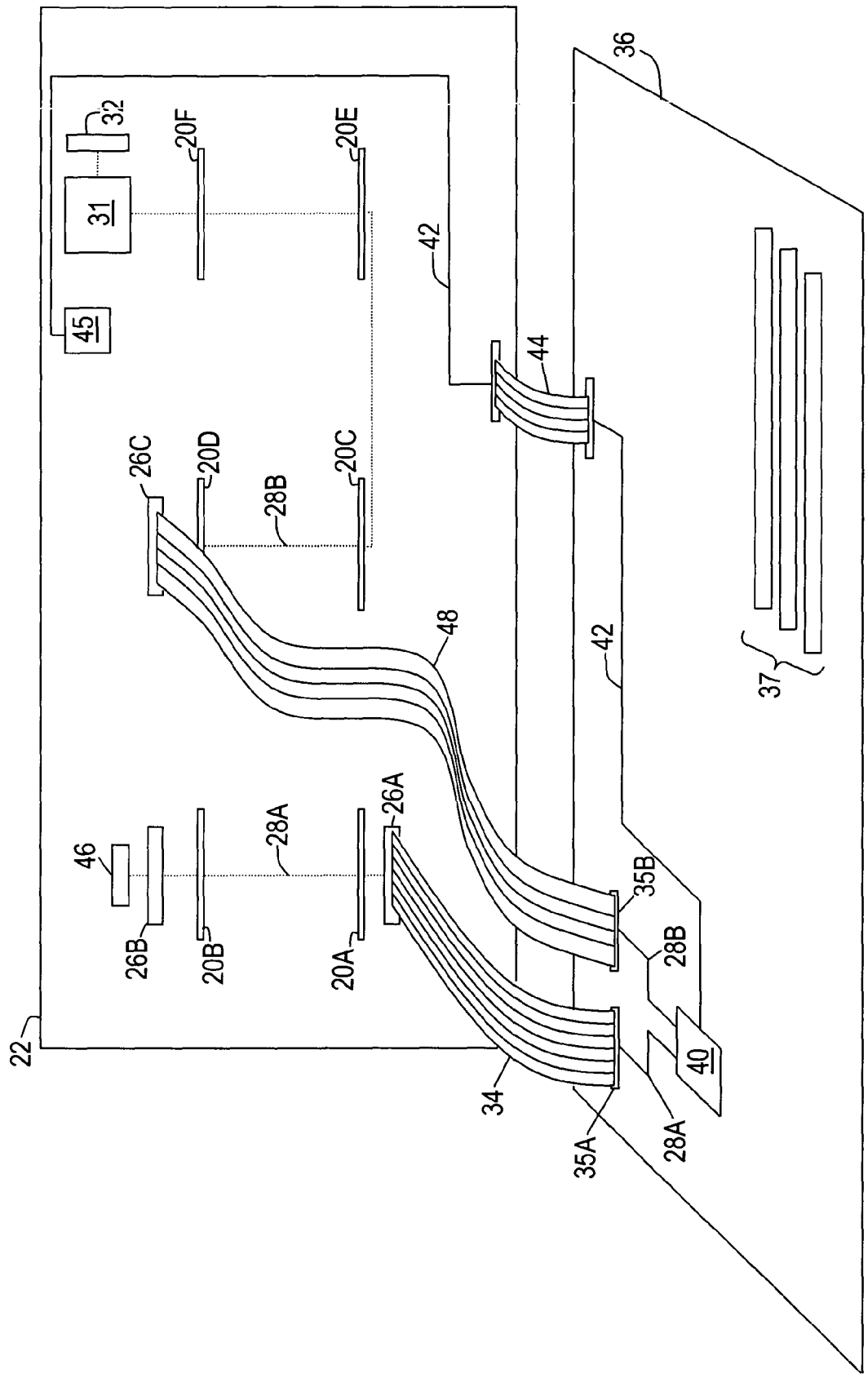
FIG. 3B shows an alternate configuration of a storage controller and a backplane controller.

FIG. 3B shows cable connectors 26A-C configured in a "dual bus" arrangement, where separate busses 28A-B may be formed by dividing or splitting bus 28. Busses 28A-B may be any type of bus, such as a SCSI bus. In the dual bus arrangement, cable connector 26B couples to a terminator 46, which may electrically terminate bus 28A. Cable connector 26C couples to the cable connector 35B on I/O board 36 via ribbon cable 48. Connection between cable connector 26A and cable connector 35A preferably remains unchanged from the single bus configuration shown in FIG. 3A. In this manner, storage controller 40 couples to bus 28A via ribbon cable 34 and also couples to bus 28B via ribbon cable 48. Ribbon cable 44 and bus 42 may be configured similar to the configuration shown in FIG. 3A such that storage controller 40 may couple to backplane controller 45 via bus 42.

Note that alternate configurations for cable connectors 35A-B and cable connectors 26A-B are possible. For example, cable connector 26A may couple to cable connector 35B to form one bus, and likewise cable connector 26C and 35A may be coupled together to form another bus.

With the backplane 22 configured in a dual bus arrangement, the storage controller 40 preferably implements RAID techniques on each bus. For example, the storage devices coupled to the connectors 20A-B (i.e., the devices on bus 28A), may form a first array of storage devices. The devices on bus 28A preferably include an operating system (OS) where the OS may be mirrored onto each storage device on bus 28A. With the storage devices on bus 28A configured in this manner, the storage devices coupled to connectors 20C-F (i.e., the devices on bus 28B), preferably form a second array of storage devices that contain data. In this arrangement, the data may be spread across the various storage devices on bus 28B using the parity techniques described above. Therefore, using a dual bus arrangement, data redundancy is separately provided for the OS and also for the data.

The secondary backplane controller 45 preferably receives status and control information, from the storage controller 40, via bus 42. Backplane controller 45 preferably indicates the status of the storage devices coupled to bus 28A. The status and control information may be used by the storage devices coupled to bus 28A to communicate information about each storage device to the user. For example, if the storage device coupled to connector 20A fails, the storage controller 40 may detect this via bus 28A. Consequently, the storage controller 40 may issue a status update to the backplane controller 45 via bus 42. Backplane controller 45 may then indicate the failure of the storage device coupled to connector 20A by illuminating the LEDs 24.

Backplane controller 31 preferably receives status and control information, from the storage controller 40, via bus 28B. The status and control information preferably is used by the storage devices on bus 28B to communicate information about each storage device on bus 28B to the user. For example, if the storage device coupled to connector 20C fails, the storage controller 40 may detect this via bus 28B. Accordingly, the storage controller 40 may issue a status update to the backplane controller 31 via the bus 28B. Backplane controller 31 may then indicate the failure of the storage device coupled to connector 20C by illuminating the LEDs 24. Therefore, under normal operating conditions in the dual bus configuration, backplane controller 45 utilizes two busses (i.e., bus 28A and bus 42), and backplane controller 31 utilizes one bus (i.e., bus 28B). However, under normal operating conditions in the single bus configuration (shown in FIG. 3A), backplane controller 31 utilizes one bus (bus 28).

Figure 4A:
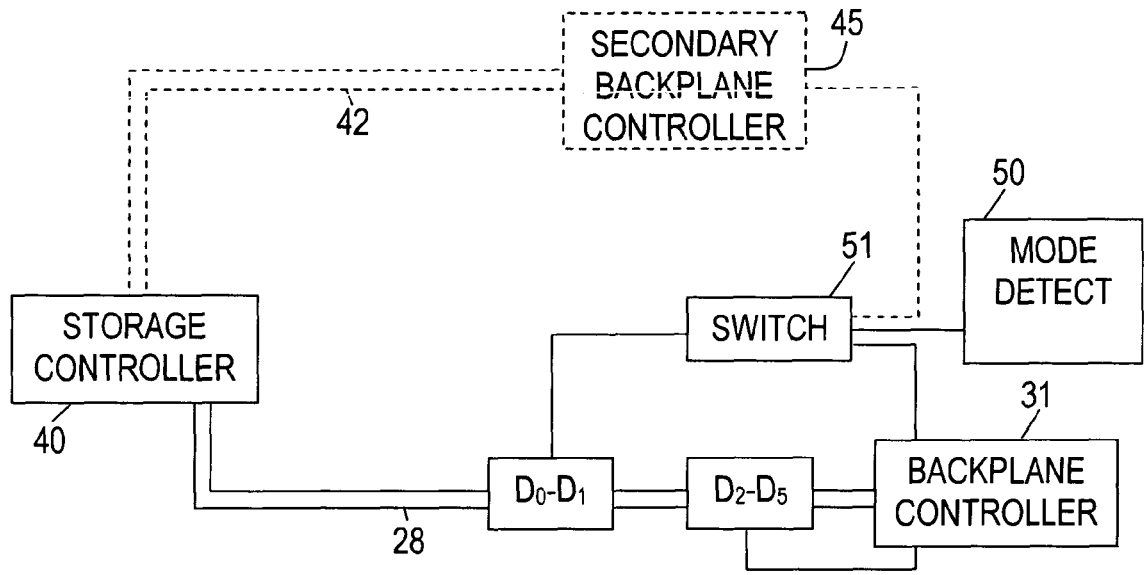
FIG. 4A shows an exemplary configuration of a single bus arrangement.
Figure 4B:
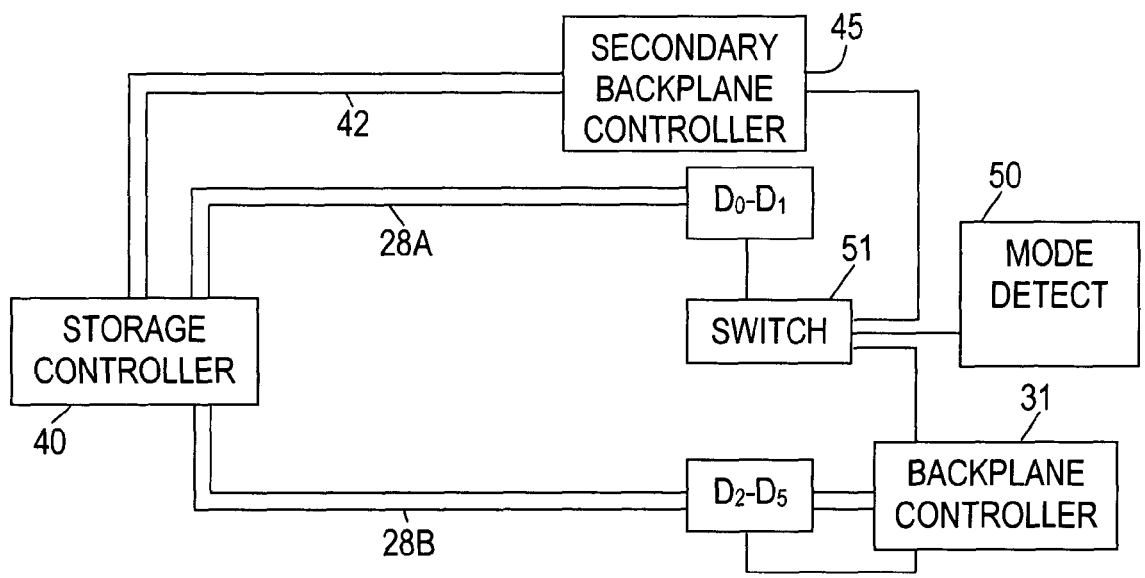
FIG. 4B shows an exemplary configuration of a dual bus arrangement.

FIGS. 4A and 4B depict block diagrams of an exemplary bus switch in single bus mode and dual bus mode, respectively. Mode detect logic 50 determines the bus configuration of backplane 22 (i.e., single bus versus dual bus). For example, if a ribbon cable is connected between connectors 26B and 26C (as shown in FIG. 3A), then the mode detect logic 50 determines a single bus configuration. The mode detect logic 50 may accomplish this, for example, by determining the electrical resistance of connectors 26B and 26C, where the value of the resistance is related to whether a ribbon cable is present or whether a the bus is terminated using a terminator. The mode detect logic 50 preferably coordinates with a bus switch 51 in order to couple the appropriate backplane controller (i.e., backplane controller 45 or backplane controller 31) to the appropriate bus depending on the determined bus configuration.

FIG. 4A depicts the single bus arrangement in which the storage controller 40 couples to the storage devices $D_0$-$D_5$ and backplane controller 31 via bus 28. The storage controller 40 also may couple to the secondary backplane controller 45 via bus 42. The switch 51 preferably couples to backplane controllers 31 and 45 as well as storage devices $D_0$-$D_1$. Mode detect logic 50 preferably determines the configuration of the various busses in the system and conveys this information to the switch 51. The switch 51 then may couple different backplane controllers to different storage devices depending on the bus configuration information provided by mode detect logic 50. In the single bus configuration shown in FIG. 4A, the mode detect logic 50 may determine the single bus configuration, and in response, the switch 51 will convey status and control information to devices $D_0$-$D_1$ from backplane controller 31 using bus 28. Furthermore, the backplane controller 45 and bus 42 are shown with dashed lines in FIG. 4A to indicate that they generally are not used in the single bus configuration. In the dual bus configuration of FIG. 4B, the mode detect logic 50 may determine the single bus configuration, and in response, the switch 51 will convey status and control information to devices $D_0$-$D_1$ from backplane controller 45 using bus 42. In addition to conveying status and control information to devices $D_0$-$D_1$, the switch 51 will convey status and control information to devices $D_2$-$D_5$ from backplane controller 31 using bus 28B. In this manner, the storage devices $D_0$-$D_1$ may form one array of and storage devices $D_2$-$D_5$ may form a separate array, where RAID techniques are implemented on each array separately.

The above discussion is meant to be illustrative of the principles and various embodiments of the present invention. Numerous variations and modifications will become apparent to those skilled in the art once the above disclosure is fully appreciated. For example, other standards may be employed to implement the secondary bus which allow a reduction in the amount of physical space used. It is intended that the following claims be interpreted to embrace all such variations and modifications.

What is claimed is:

1. A method, comprising:
   coupling a plurality of storage devices to a communication channel;
   detecting whether the communication channel has been divided into multiple sub-channels;
   communicating, from a first backplane controller, status and control information to the storage devices; and
   communicating, from a second backplane controller, status and control information to a subset of the storage devices based on the communication channel being divided and to none of the storage devices based on the communication channel not being divided.

2. The method of claim 1, wherein the sub-channels include a first sub-channel and a second sub-channel and the first sub-channel contains an operating system (OS) and the second sub-channel contains data.

3. The method of claim 2, wherein the first sub-channel comprises a small computer system interconnect (SCSI) bus and the second sub-channel comprises an inter-integrated circuit bus.

4. The method of claim 1, wherein each sub-channel includes at least two storage devices.

5. The method of claim 1, wherein the sub-channels are chosen from a group consisting of a small computer system interconnect (SCSI) channel and an advanced technology attachment (ATA) channel.

6. The method of claim 1, further comprising performing redundant array of independent disks (RAID) techniques on the sub-channels.

7. A system, comprising:
   a first backplane controller coupled to a first bus;
   a plurality of storage devices coupled to the first bus;
   a switch coupled to the first backplane controller and a second backplane controller; and
   mode detection logic;
   wherein the first bus is capable of being split into multiple sub-busses;
   wherein the mode detection logic is capable of detecting whether the first bus has been split into multiple sub-buses;
   wherein if the mode detection logic determines the first bus is split, the storage devices are allocated among the sub-busses;
   wherein the sub-busses include a first sub-bus and a second sub-bus;
   wherein the switch, based on the first bus being split, couples the storage devices on the first sub-bus to the first backplane controller and the devices on the second sub-bus to the second backplane controller;
   wherein the switch, based on the first bus not being split, couples all of the storage devices to the first backplane controller and couples the second backplane controller to none of the storage devices; and
   wherein the second backplane controller is coupled to a second bus.

8. The system of claim 7, wherein there are at least two storage devices coupled to the first sub-bus and there are at least four storage devices coupled to the second sub-bus.

9. The system of claim 7, wherein the storage devices coupled to the first sub-bus receive status and control information from the second backplane controller and the storage devices coupled to the second sub-bus receive data from the first backplane controller.

10. The system of claim 9, wherein the status information indicates storage device failure.

11. The system of claim 7, wherein the first bus is a SCSI bus.

12. The system of claim 7, wherein the second bus is an inter-integrated circuit bus.

13. The system of claim 7, wherein the storage devices coupled to each sub-bus form a RAID.

14. The system of claim 13, wherein the OS is stored on the storage devices coupled to the first sub-bus and data is stored on the storage devices coupled to the second sub-bus.

15. The system of claim 7, wherein the system is rack mounted and the storage device is capable of being hot swapped.

16. The system of claim 7, wherein the storage device comprises a blade server.

17. A system, comprising:
a first means for controlling a backplane coupled to a first bus;
a means for storing coupled to the first bus;
a second means for controlling the backplane coupled to a second bus;
means for switching between the first and second controlling means; and
means for detecting whether the first bus is split;
wherein the first bus is capable of being split into multiple sub-busses and the means for storing are allocated among the sub-busses; and
wherein the means for switching couples:
the first controlling means to all of the means for storing based on the first bus not being and to a first subset of the means for storing based on the first bus being split; and
the second controlling means to a second subset of the means for storing based on the first bus being split and to none of the means for storing based on the first bus not being split.

18. The system of claim 17, wherein the means for storing on each sub-bus form a RAID.

19. The system of claim 17, wherein the storage means coupled to a first sub-bus includes an OS and the storage means coupled to a second sub-bus includes data, and wherein the storage means on the first and second sub-busses implement RAID techniques independently.

* * * * *

UNITED STATES PATENT AND TRADEMARK OFFICE
CERTIFICATE OF CORRECTION

PATENT NO. : 8,639,866 B2  Page 1 of 1
APPLICATION NO. : 10/636440
DATED : January 28, 2014
INVENTOR(S) : Raghavan V. Venugopal et al.

It is certified that error appears in the above-identified patent and that said Letters Patent is hereby corrected as shown below:

In the Claims

In column 8, line 13, in Claim 17, after "being" insert -- split --.

Signed and Sealed this
Third Day of June, 2014

Michelle K. Lee
*Deputy Director of the United States Patent and Trademark Office*